United States Patent Office

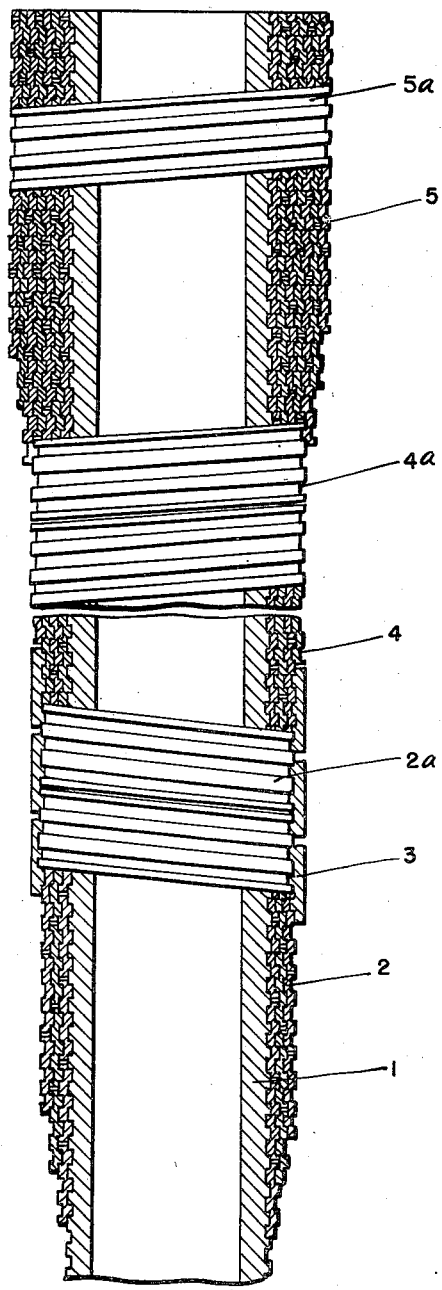

2,822,825
Patented Feb. 11, 1958

2,822,825

TAPE-WOUND VESSELS OR PIPES FOR HIGH-PRESSURE SERVICE

Hans Enderlein, Ludwigshafen (Rhine), and Otto Konrad, Schriesheim-Bergstrasse, Germany, assignors to Badische Anilin- & Soda-Fabrik Aktiengesellschaft, Ludwigshafen (Rhine), Germany Application December 29, 1954, Serial No. 478,445

Claims priority, application Germany January 2, 1954

3 Claims. (Cl. 138—64)

It has been known from numerous publications, for example from "Transactions of the ASME," 1953, pp. 361 et seq. and from CJOS No. XXX—103, 1945, pp. 53 et seq., to fabricate hollow bodies for use as vessels or pipe-lines by spirally wrapping core tubes with metallic bands unwelded at their contacting edges, the bands exerting a uniform shrinking stress on the core tube. Special advantage was found to be afforded by the use of profiled bands capable of taking up tangential stresses as well as axial stresses. These shrink-stressing bands, by reason of their spiral type wrapping, exert a torsional action on the core tube. The torsional stress thus set up in core tubes may have a detrimental effect when thin core tubes or core tubes having lengthwise welding seams are used or also when a great number of banded layers is used and thus endanger the entire hollow body, because the torsional stress may rise beyond the permissible limit.

The present invention provides a new and efficient method of manufacturing tape-wound vessels by which the aforesaid shortcomings are overcome and vessels designed for high and extreme pressures, say 1000 atmospheres and more, can be made, i. e. vessels that require a great number of band layers. In the practice of our invention vessels built up of a core tube and at least two layers of spirally wound-on bands of a smooth or profiled type, the said bands being under shrinking stress and not interwelded at their contacting edges, are wrapped with at least one band layer in such a manner that a torsional stress opposite to that of the other layer or layers is produced. In a practical embodiment of our invention the banded layers will be wound on partly in a right-handed and partly in a left-handed manner.

When smooth-faced bands are used no difficulty will be attached to changing over from one direction of winding to another. However, when profiled bands would be used great inconveniences would be experienced through the profiles intercrossing when the direction of winding is changed. This drawback might be overcome by using for any two layers between which a change-over in the direction of winding takes place, bands which are profiled on one side and smooth on the other side, and wrapping them on in such a manner that the smooth sides come face to face, whereas the profiled sides will engage the adjoining profiled layers.

With any two band layers lying with their smooth sides face to face, i. e. in the absence of any provision between them to secure them perfectly in place, forces acting in an axial direction will be transferred only unsatisfactorily between these layers. This shortcoming, however, is most inconveniently felt when flanges are to be provided on the banded layers. The provision made in accordance with our invention to overcome this drawback is to use a band having a profiled inside face, but a smooth unprofiled outside face only as the last or top layer of a plurality of band layers wound on in one direction of winding, the profiled inner face of this band engaging in and interlocking with, the profiled band underneath it. The smooth outer face of the band then has cut into it a profile which runs opposite to the direction in which the band is wrapped on and into the profile so produced on the smooth surface of the top layer another band layer profiled on at least one side comes to engage on its profiled side. The band used should be at least as thick as the band profiled on either side measured at the point of its greatest thickness.

Since tape-wound vessels mostly are imperfectly round and/or cylindrical great difficulty is attached to cutting the profile, for example by turning or milling, inasmuch as the band may already be cut through at an elevated place when the profile may still be insufficiently worked out at a depressed place. A remedy of such inconveniences would be using a band of sufficient thickness, but new difficulty would be involved in winding on such bands, especially when they are being heated.

With a view to overcoming these shortcomings our invention furthermore provides a new and efficient method of cutting profiles into an outside smooth layer of bands, which consists in controlling the depth of penetration of the cutting tool, for example the turning or milling tool, from the surface of the smooth surface to be profiled. This may be done after the fashion, for example, of copying lathes in which the feed of the turning tool is controlled by a shaped ruler, the function of which is carried out by the turning banded vessel in the instant case.

The profile selected in the practice of our invention may be, for example, that used in the construction of high-pressure vessels according to British patent specification 525,275. The width of the bands may be from 30 to 100 millimeters and their thickness from 3 to 10 millimeters. The materials used for the bands may be, for example, plain steels and refined steels, i. e. steels alloyed with chromium, vanadium, molybdenum, nickel, silicon, and allied metals.

The accompanying drawing, by way of example, illustrates one mode of construction of a tape-wound vessel made in accordance with our invention.

With reference to the drawing, 1 denotes the core tube, 2 is a sectional view of the first three band layers wound on the core tube in a left-hand direction of winding, whereas 2a is a top view of the same system of band layers. 3 denotes a band layer having a profiled inner side, but a smooth, non-profiled outer side. As shown in a sectional view by 4 and in a top view by 4a a right-hand profile is cut into the smooth outside face of the band and onto the band so profiled further band layers 5 (in section) or 5a (top view) are wound in a right-hand manner.

We claim:

1. In a metallic hollow body for high pressure service of the type having a core tube with a plurality of profiled metal bands spirally wrapped and shrink-stressed on the core tube, the improvement which comprises at least two adjoining profiled metal bands having a direction of spiral wrapping transverse to each other to provide an opposite torsional stress, each of said adjoining metal bands having their contacting sides profiled for interengagement in the direction of spiral wrapping of the outermost metal band.

2. In a metallic hollow body for high pressure service of the type having a core tube with a plurality of profiled metal bands spirally wrapped and shrink-stressed on the core tube, the improvement which comprises at least two adjoining profiled metal bands having a direction of spiral wrapping transverse to each other to provide an opposite torsional stress, each of said adjoining metal bands having their contacting sides profiled for interengagement in the direction of spiral wrapping of the outermost metal band and each of said adjoining metal bands having their remote sides profiled such that each metal band is profiled in its own direction of spiral wrapping.

3. In a method of manufacturing a metallic hollow body for high pressure service of the type having a core tube and a plurality of interengaging profiled metal bands spirally wrapped and shrink-stressed on the core tube, the steps which comprise spirally wrapping a metal band having a smooth outer surface and an inner surface profiled in the direction of spiral for engagement with an underlying correspondingly profiled surface, cutting a spiral profile in said smooth outer surface transversely to the first-named band, and spirally wrapping a second profiled metal band transversely to the first-named band in engagement therewith, said second band having an inner surface profiled in its direction of spiral for said engagement with said first-named band.

References Cited in the file of this patent
UNITED STATES PATENTS

| | | |
|---|---|---|
| 1,951,723 | Burd et al. | Mar. 20, 1934 |
| 2,253,093 | Raichle et al. | Aug. 19, 1941 |
| 2,326,176 | Schierenbeck | Aug. 10, 1943 |